United States Patent [19]
Fogle

[11] Patent Number: 6,035,618
[45] Date of Patent: Mar. 14, 2000

[54] FIXED-LINE TRIMMER HEAD

[75] Inventor: John R. Fogle, Cave Creek, Ariz.

[73] Assignee: Robert L. Phillips, Scottsdale, Ariz.

[21] Appl. No.: 09/044,470

[22] Filed: Mar. 19, 1998

[51] Int. Cl.[7] .................................................. A01D 34/84
[52] U.S. Cl. ................................ 56/12.7; 56/295; 30/276
[58] Field of Search ..................................... 56/12.7, 16.7, 56/17.5, 17.2, 12.1, 16.9, 255, 295; 30/276, 347, 296.1

[56] References Cited

U.S. PATENT DOCUMENTS

| | | | |
|---|---|---|---|
| 4,756,146 | 7/1988 | Rouse | 56/12.7 |
| 5,023,998 | 6/1991 | Masciarella et al. | 30/276 |
| 5,048,278 | 9/1991 | Jones et al. | 56/295 |
| 5,433,006 | 7/1995 | Taguchi | 30/276 |
| 5,615,543 | 4/1997 | Caffey et al. | 56/295 |
| 5,659,964 | 8/1997 | Lawrence | 30/276 X |

OTHER PUBLICATIONS

Grass Gator Installation Instructions–No date.
Echo Installation Instructions–No date.

*Primary Examiner*—Robert E. Pezzuto
*Attorney, Agent, or Firm*—LaValle D. Ptak

[57] ABSTRACT

A fixed line trimmer head for string trimmer machines is made to accommodate trimmer lines of a range of line sizes, from a relatively small diameter line to a maximum diameter line, typically from 0.080" to 0.160". To accomplish this, the trimmer head consists of a generally cylindrically-shaped hollow main housing member having a central axis through it. Exit openings for the line are formed on diametrically opposite sides of the main housing member in a plane which is perpendicular to the axis of the housing member. A first set of string entry holes is formed through the housing member in a plane which is offset from the plane of the exit openings; and these holes are located on opposite sides of a line which is perpendicular to the projection of a line passing through the exit openings. A second set of string entry holes is located on the opposite side of the hollow main housing member from the first entry holes; and these second holes have a diameter which is greater than the diameter of the first and second entry holes. Typically, the diameter of the first and second entry holes is selected to accommodate the smallest size line which may be used with the trimmer head; and the diameter of the entry holes for the third and fourth entry holes is selected to accommodate the largest size line which may be used with the trimmer head. The exit openings are selected to accommodate the largest size line which may be passed through the third and fourth entry holes.

33 Claims, 3 Drawing Sheets

U.S. Patent    Mar. 14, 2000    Sheet 1 of 3    6,035,618
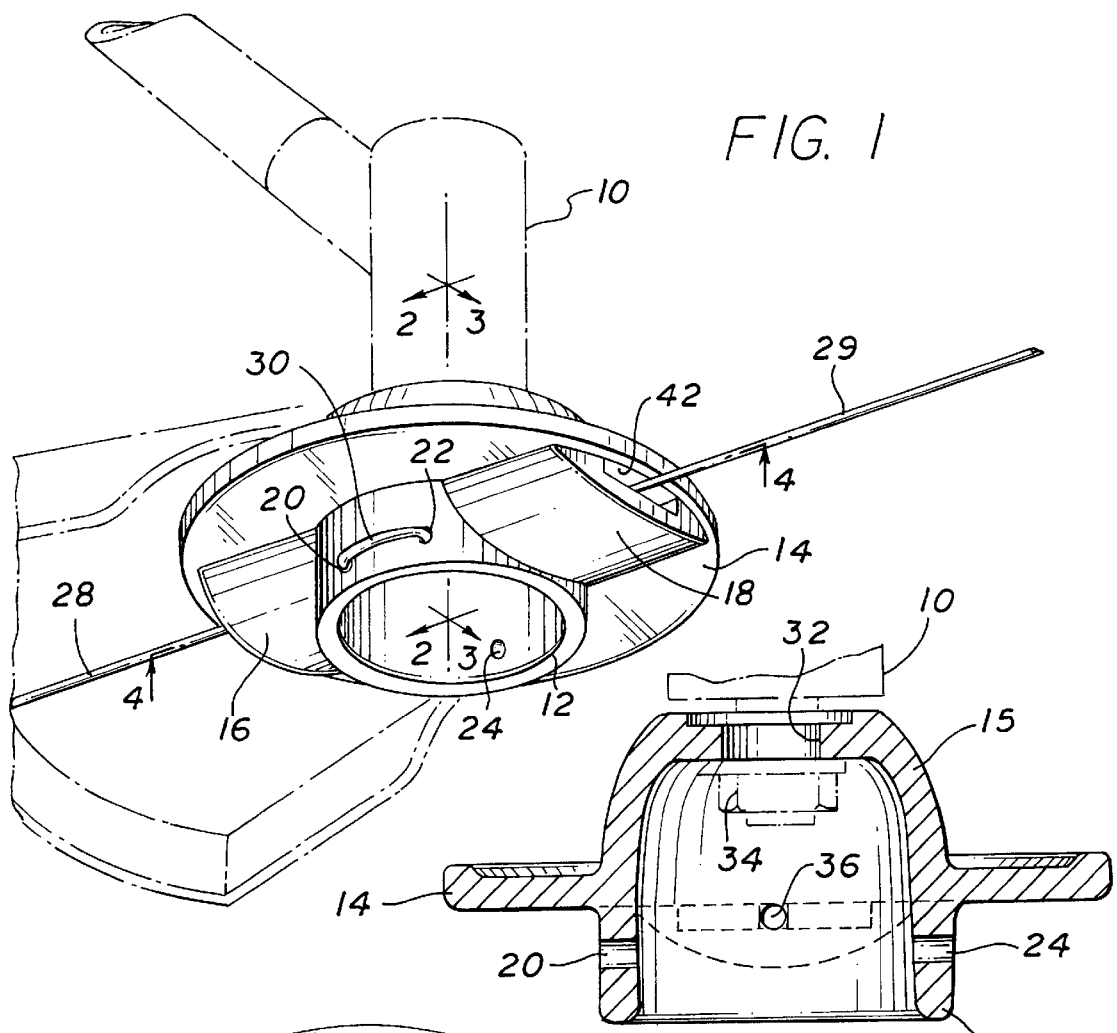
FIG. 1
FIG. 2
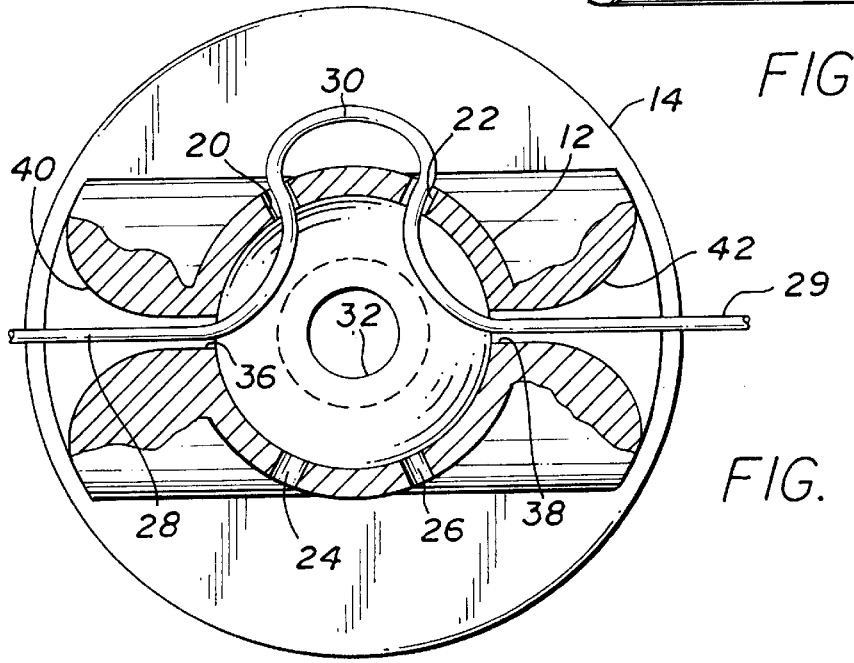
FIG. 4

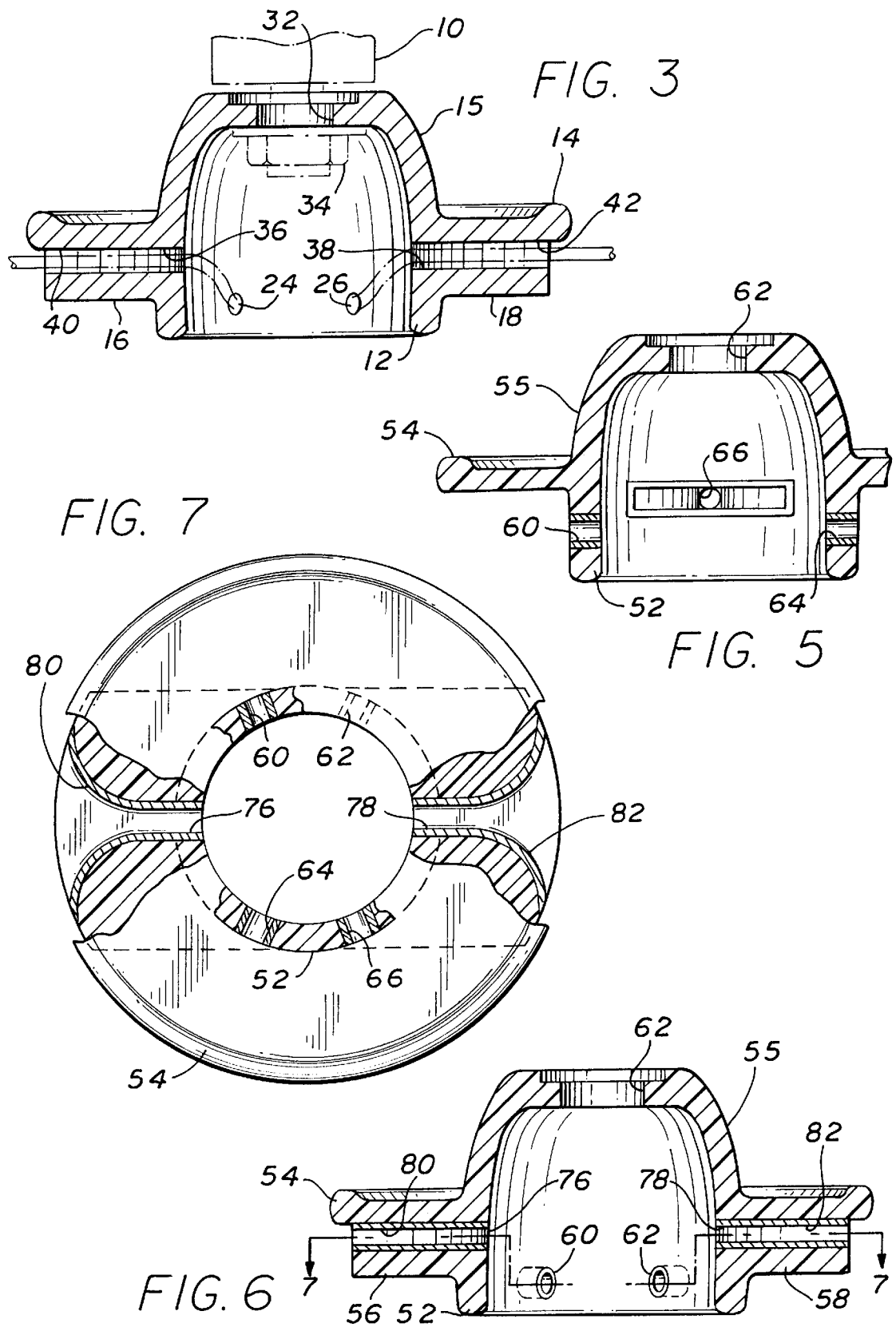

FIXED-LINE TRIMMER HEAD

BACKGROUND

Weed and grass trimmers have been developed which employ a rotatable hub with a short length of flexible nylon or other plastic line extending from the hub. When the hub is rotated (typically at speeds from 6,000 RPM to 12,000 RPM), the tip of the line extending from the hub provides the cutting or trimming action. Grass and weed trimmers using this principle of operation have become popular for their versatility of use and because the flexible trim line is safer to use than rigid rotating steel blades.

Various types of devices have been developed for using such trim lines. Typically, rotating line trimmers or rotating string trimmers employ a line which generally has a circular cross section. The line, in many trimmers, is wound on a storage reel in the hub of the device and is fed out of a hole in the hub in discrete amounts, as the end breaks off or wears off. Trimmers of this type sometimes are referred to as "bump and feed" trimmers, since, when the line breaks off, the bottom of the storage reel is bumped on the ground to cause a spring release of the line within the trimmer, which then plays out a short length of line through a hole in the hub by means of centrifugal force when the trimmer is operating. Typically, the smaller (with 2½" diameter to 3½" diameter head) bump and feed string trimmers use the relatively small diameter line, normally in the range of 0.065" to 0.080" diameter, since the smaller diameter flexible line functions better for the centrifugal feeding of such a smaller diameter bump and feed head.

The reason that small diameter line is used in bump and feed string trimmers is that heavier diameter line (for example, 0.115" to 0.160" diameter) typically is too stiff for winding and for the centrifugal feeding used in bump and feed heads. Commercial bump and feed heads use a larger diameter head than was designed for home use, and operate with somewhat larger diameter flexible line, generally from 0.95" to 0.105" diameter and normally have a larger capacity for such line. Thus, less frequent reloading of the line is required.

A problem exists with bump and feed trimmers, however, in that frequently the line which is wound on the storage reel in the hub tends to become stuck, either due to partial fusion of the line within the hub, caused by high frequency vibration, or by successive turns of the line wound on the hub becoming somewhat entangled. As a result, feeding of the line from the hub, when desired, does not take place. When this occurs, it is necessary to remove the hub from the string trimmer device and manually extract the desired length of line prior to reattaching the hub to the device. This is a very time consuming and frustrating experience for many users of flexible line string trimmers.

For commercial use employing relatively large diameter lines, for example 0.115" to 0.160" diameter, fixed-line trimmer heads usually are employed. The large diameter monofilament nylon lines are particularly useful where weed and grass growth is dense. The large diameter lines also provide longer length of service before the line needs to be replaced. Due to the hole design and pattern, smaller standard sized lines (under about 0.095" diameter) have a tendency to slip out of commercial fixed heads during operation.

One type of fixed line trimmer head for commercial use is the Echo® heavy duty fixed line trimmer head, stock No. 999442-0020. This trimmer head is designed to replace a saw blade trimmer/brush cutter or other types of flexible line trimmer heads. The Echo® trimmer head is open on its underside and provides serpentine paths for the insertion of two fixed lengths of 0.130" diameter monofilament nylon line. The line is inserted between closely spaced, offset guide surfaces to hold it in place during operation. When a new length of line needs to be inserted, the old line must be removed, and the new line guided in place around the guide surfaces. Because the guide surfaces are close together and 0.130" diameter line is relatively stiff, it is difficult to install and remove sections of nylon line from the Echo® trimmer head. This difficulty results in excessive time being consumed for the removal and replacement of line segments.

Another fixed-line trimmer head is known as the Grass Terminator® replacement head, designed for replacing the "bump and feed" spool cartridges of a variety of line trimmer machines designed for home use. The Grass Terminator® fixed head also employs guide paths for feeding two segments of line into and out of the head. The guide paths used with this head, in some cases, tend to allow the line to be pulled out of the head when it strikes an obstruction such as a chain link fence or the like, particularly when the small diameter trim lines for which it is designed are used.

Accordingly, it is an object of this invention to provide an improved fixed-line trimmer head for string trimmer machines which overcomes the disadvantages of the prior art, which may be used as an alternative to bump and feed cartridges, which is easy to load and replace, and which securely holds fixed segments of line of different sizes in place during use.

SUMMARY OF THE INVENTION

Accordingly, it is an object of this invention to provide an improved trimmer head for string trimmer machines.

It is another object of this invention to provide an improved fixed-line trimmer head for string trimmer machines.

It is an additional object of this invention to provide an improved fixed-line trimmer head for string trimmer machines in which the line is simple to install and replace.

It is yet another object of this invention to provide an improved fixed-line trimmer head for string trimmer machines capable of use with lines varying over a relatively wide range in diameter.

It is a further object of this invention to provide a fixed-line trimmer head for string trimmer machines which is easy to load with trimmer line and employs a pattern of exit and entry holes designed to firmly hold the line in place during use, and to facilitate rapid removal of line which is to be replaced.

In accordance with a preferred embodiment of the invention, a fixed line trimmer head for string trimmer machines employs a generally cylindrically-shaped hollow main housing member having a central axis and configured at a first end for attachment to the drive shaft of a string trimmer machine. The hollow main housing member is open at a second end. First and second string entry holes are formed through the main housing member; and these entry holes are spaced an equal distance from a first line passing through and perpendicular to the axis of the main housing member. First and second string exit openings are formed on the housing member on opposite sides of the main housing member. The exit openings are offset along the axis of the main housing member from the entry holes. Guides are located adjacent the exit openings and are connected to the exit openings to guide trimmer string exiting from the first and second openings.

BRIEF DESCRIPTION OF THE DRAWINGS

FIG. 1 is a bottom perspective view of a preferred embodiment of the invention;

FIG. 2 is a cross-sectional view taken along the line 2—2 of FIG. 1;

FIG. 3 is a cross-sectional view taken along the line 3—3 of FIG. 1;

FIG. 4 is a bottom offset cross-sectional view of the embodiment shown in FIG. 1;

FIG. 5 is a cross-sectional view of an alternative embodiment of the invention similar to the view shown in FIG. 2;

FIG. 6 is a cross-sectional view of the alternative embodiment of FIG. 5 similar to the cross-sectional view of FIG. 3;

FIG. 7 is a partially cut-away bottom view of the embodiment shown in FIGS. 5 and 6;

DETAILED DESCRIPTION

Figure 8:
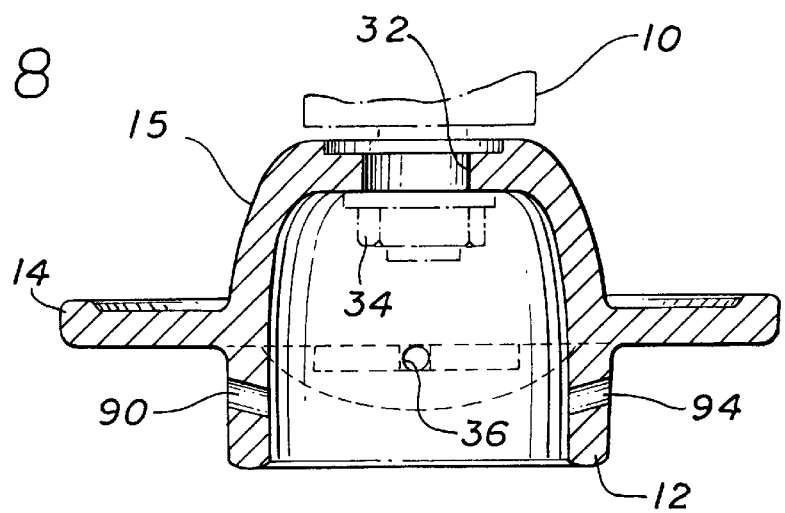
FIG. 8 is a cross-sectional view similar to that of FIG. 2 showing a variation thereof.

Reference now should be made to the drawings, in which the same numbers are used throughout the different figures to designate the same components. FIG. 1 is a bottom perspective view of a preferred embodiment of the invention shown attached in place on the end of the operating shaft of a string trimmer machine 10. A fixed-line trimmer head comprises a central cylindrically shaped hollow main housing 12, with a circular flange 14 located intermediate its length. The lower end of the housing 12 is open, as is readily apparent from an examination of FIGS. 1 and 2. The upper end of the housing comprises a portion 15 located above the flange 14. The end of the portion 15 is substantially closed, with a hole 32 formed through it. As shown in FIG. 2, the hole 32 is used to accommodate the drive shaft of the string trimmer machine 10, which then is secured to the housing 12, 14, 15 by means of a nut 34 or bolt (depending upon the design of the machine 10), as illustrated generally in FIG. 2.

Typically, the fixed-line trimmer head shown in the drawings is used to replace a bump and feed cartridge generally employed with string trimmer machines designed for home use. When the trimmer head shown in the drawings is attached in place, it is rotated at the speed of rotation of the drive shaft of the string trimmer machine 10. This speed of rotation for typical string trimmer machines ranges from a low of 6,000 RPM to a high of approximately 12,000 RPM. A typical operating speed is on the order of 8,000 RPM; although various factors cause this speed to vary with any given machine, depending upon the length of line used, the diameter of the line, and the number of lines extending from the rotating head.

For a commercial embodiment of the head shown in FIGS. 1 to 4, the outside diameter of the portion 12 of the main housing member is approximately 2⅛"; and the wall thickness of the portion 12 is approximately ¼". The outside diameter of the flange 14 is 4"; and the overall height of the housing, from the top of the upper portion 15 to the open bottom of the portion 12, is approximately 2". These dimensions are those which are typical of a head designed for use with a large number of different string trimmer machines manufactured by a variety of manufacturers for the home use market. Clearly, the dimensions of the trimmer head may be varied in accordance with particular machines designed for different uses, as desired.

As shown most clearly in FIGS. 2, 3 and 4, a fixed length of nylon trimmer line 30 is installed in the trimmer head by inserting opposite ends (28 and 29) of the line through a pair of entry holes 20 and 22 (or, alternatively, 24 and 26) to form a bight or loop in the line 30 substantially at its center, as illustrated in FIG. 4. The free ends 28 and 29 of the line segment 30 then are inserted through a pair of diametrically opposed exit openings 36 and 38, which extend outwardly into a corresponding pair of flared guides 40 and 42, as shown most clearly in FIG. 4. The free ends 28 and 29 typically extend beyond the outer diameter of the flange 14 to an extended line length of between 5 and 7 inches. At the 7" extension, the "cut path" for a head having the dimensions given is 18". A narrower cut path obviously is provided for line extensions which are less than 7" beyond the outer circumference of the flange 14.

It should be noted, from an examination of FIGS. 2 and 3, that the entry holes 20 and 22 or 24 and 26 are located in a position near the open bottom of the cylindrical housing 12. This position is beneath the plane in which the exit openings 36 and 38 are located, causing an offset between the entry holes 20, 22 (24, 26) and the exit openings 36 and 38 to occur. This is most clearly illustrated in FIG. 3, which shows the path, in dotted lines, of the trimmer line passing through the entry holes 24 and 26, and from there through the exit openings 36 and 38. To ensure that the trimmer line which extends outwardly in the form of the segments 28 and 29 from the exit openings 36 and 38 does not slip but is securely held in place, the entry holes 20, 22 and 24, 26 are formed radially through the housing (and are of a diameter which does not exceed about 1.8 times of the external line diameter). Thus, the ends of the bight 30 of the segment of trimmer line inserted through them exit toward the axis of the cylinder 12 and then are guided at an acute angle outwardly to the diametrically opposed exit openings 36 and 38. It also should be noted that the sets of entry holes 20, 22 or 24, 26 are located an equal distance on either side of a line which is perpendicular to the projection of a line or plane passing through the openings 36 and 38 along the longitudinal direction of the axis of the main housing 12, 14, 15. This is shown most clearly in FIG. 4. With the line configured as shown in FIG. 4, the trimmer line is firmly held in place and does not slip, even when a significant pulling force is subjected to either of the segments 28 and 29 in an attempt to withdraw the line outwardly from the exit openings 36 or 38. In the actual embodiment of the invention which has been constructed in accordance with the dimensions given previously, the distance between the two holes of each set 20, 22 or 24, 26, was selected to be 1".

It further should be noted that although the fixed-line trimmer head which has been described above is illustrated as providing a single pair of oppositely oriented trimmer string segments 28 and 29 on opposite sides of the head, two sets of entry holes 20, 22 and 24, 26 are provided for accommodating trimmer lines of different sizes. For example the holes 20, 22 typically are configured to accommodate a maximum diameter line size, for example 0.160"; so that lines of this size may be used. On the other hand, the pair of entry holes 24, 26 are provided with a smaller internal diameter, for example of 0.080" to 0.090". The diameter of these holes is too small to permit insertion of the larger diameter sizes, for example 0.130" to 0.160". If a smaller line diameter were to be inserted into the larger holes 20/22, it is possible that the fit would be so loose that slippage of the line during operation could occur. By providing two sets of holes to accommodate lines in a relatively limited range of sizes, smaller sizes for the holes 24, 26 and larger sizes for the holes 20, 22, the fixed-line trimmer head which is shown and which has been described above provides a wide range of flexibility for use.

It should be noted that by offsetting the entry holes and the exit openings along the length of the housing portion 12, as described, further slip prevention of the line is provided, since the actual path of the line segment from the end 28 through the trimmer head to the segment 29 is a multiple curved path in different planes. This path simply and effectively provides the degree of tightness required to reduce line slippage without requiring complex line threading paths for the insertion and removal of line segments.

Figure 9:
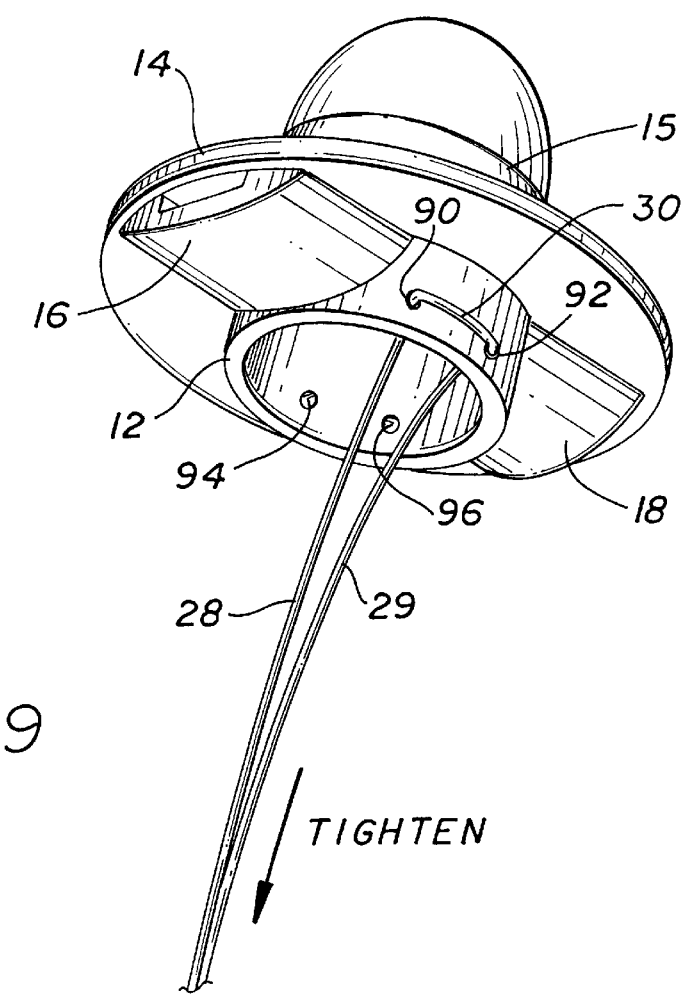
FIG. 9 is a perspective view of the variation of the embodiment shown in FIG. 8.

FIGS. 8 and 9 illustrate a variation of the embodiment shown in FIGS. 1 through 4. The embodiment of FIGS. 8 and 9 is identical in all respects to the embodiment of FIGS. 1 through 4, with the exception that the radially directed entry hole pairs 20, 22 and 24, 26 have been replaced with similarly positioned but angularly directed pairs of entry holes 90, 92 and 94, 96, respectively. As shown most clearly in FIG. 8, instead of being directed radially through the surface of the portion 12 of the housing member, the holes 90, 92 and 94, 96 are directed from an entry point on the exterior of the lower portion 12 of the housing at an angle toward the open end thereof. The contrast with the radially directed holes shown in FIG. 2 for the holes 20 and 24 is readily apparent. Everything else about the embodiment shown in FIGS. 8 and 9 is the same as the embodiment shown in FIGS. 1 through 4. By employing the angularly directed path for the entry holes 90, 92 and 94, 96, the insertion and removal of lengths of trimmer line from the hollow main housing portion 12 of the trimmer head is facilitated. For example, as illustrated in FIG. 9, when a new length of line is inserted into the trimmer head, the bight 30 is located as shown in FIG. 9 and the two ends 28 and 29 are inserted through a pair of holes 90 and 92 (or 94 and 96). This causes the ends 28 and 29 to extend downwardly out through the open bottom end of the portion 12; so that by pulling on the ends 28 and 29, the bight 30 is pulled tightly into engagement with the exterior of the housing portion 12 between the entry holes 90 and 92, as shown. After the line has been pulled firmly into place, the ends of the line sections 28 and 29 then are inserted through the openings 36 and 38 (or 76 and 78) in the same manner described above for the embodiments of FIGS. 1 through 4 and FIGS. 5 through 7.

In addition to facilitating the placement and removal of trimmer line segments from the head, the angles for the pairs of entry holes 90, 92 (or 94, 96) further cause the line 28, 29, 30 to be more tightly held in place in the head against slippage than even for the configurations shown in FIGS. 1 through 4 and FIGS. 5 through 7. The operation of the trimmer head shown in FIGS. 8 and 9 is in all other respects identical to that described above for the trimmer head shown in FIGS. 1 through 4.

Also as shown in FIGS. 1, 2 and 3, the flared exit openings 40 and 42 permit the line sections 28 and 29 to flex without bending the line at a sharp angle during operation of the machine and during impact of the line extensions 28 and 29 with grass and brush which is being cut. This further reduces the likelihood of sharp bends occurring the line segments 28 and 29, which would otherwise tend to break off the line segments if the flared guides 40 and 42 are not provided.

As shown most clearly in FIGS. 1 and 9, the flared openings 40 and 42 are located within a pair of sloped wing housing extensions 16 and 18 formed on the lower surface of the circular flange 14 of the head. The sloped surfaces of the extensions 16 and 18 (highest in the center over the center of the flared openings 40 and 42) function as wing-type surfaces which deflect objects which may be stricken by the hub during its operation, thereby preventing damage to the hub and facilitating its use over terrain which may include rocks or stumps, or other obstructions.

The device which is shown in FIGS. 1 through 4 (and FIGS. 8 and 9) ideally is made of metal, with a preferred metal being cast aluminum. When the trimmer head of the dimensions described above is made of aluminum and attached to the operating shaft of a typical string trimmer, the aluminum of the head functions as a heat sink for dissipating heat generated in the end of the drive shaft for the string trimmer. In addition, it has been discovered that when string trimmer machines are operated, the nylon trimmer string 28, 29, 30 undergoes relatively high frequency vibrations. These vibrations are transmitted to the friction points, for example the exit openings 36 and 38 in particular, and generate heat which is rapidly dissipated by the aluminum of the trimmer head. It has been found that if a trimmer head using plastic in the area of the exit openings 36 and 38 is employed, the friction between the plastic of the head and the nylon line may be sufficient to cause a slight melting or fusing of the line at the points where it contacts the exit openings, resulting in premature breakage of the line at these openings. Consequently, metal for dissipating the heat and for preventing such fusion with the housing itself has been found to be the desirable material out of which the head is manufactured.

FIGS. 5, 6 and 7 are directed to an alternative embodiment to the one described above. In this alternative embodiment, the primary portion of the trimmer head is made of molded plastic material. In view of the problem noted above, however, caused when trimmer line 28, 29, 30 is in direct contact with a plastic housing, the head shown in FIGS. 5, 6 and 7 employs metal insert sleeves 60, 62 and 64, 66 in the string entry holes and metal flared inserts 76, 80 and 78, 82 in the flared exit openings of the device shown in these figures. In all other respects, the embodiment of FIGS. 5, 6 and 7 operates in the same manner and is constructed with the same overall dimensions as the device described previously in conjunction with FIGS. 1 through 4. For example, the device of FIGS. 5, 6 and 7 includes a lower cylindrical housing portion 52, a circular flange 54, and an upper housing portion 55, with a circular opening 62 in its center corresponding to the elements 12, 14, 15 and 32, respectively, of the embodiment of FIGS. 1 through 4.

It should be noted that the fixed-line trimmer head which is shown in all of the embodiments described above provides the user with a simple loading of line segments from one side of the trimmer head, with easy loading of various line sizes, including relatively large line sizes having a diameter up to 0.160". For typical commercial string trimmer machines, designed for home use, it has been found that the head speed with two lines 28 and 29 extending from the head as illustrated, varies over a relatively narrow range for string sizes from 0.080" diameter up to 0.155" diameter. Typically, the smaller diameter lines allow the head speed to be on the order of 500 to 1000 RPMs greater than the rotational head speed of the largest diameter lines. This is not a significant operating speed variation.

One of the most significant improvements which has been noted is the increase in impact energy as the line size is increased to the larger sizes (namely, 0.130" or 0.155" diameter). For some models of presently available string trimmer machines, the impact energy nearly triples with a size increase from a line of 0.065" diameter to 0.130"

diameter. In addition, since larger line diameter flexes less than smaller lines, i.e. larger line is stiffer, when larger diameter line impacts small diameter rigid objects (such as chain link fences), line break at the head exit is minimized. The result is that by using the fixed-line trimmer head described above as a replacement for conventional bump and feed trimmer heads, and employing larger diameter lines, significant improvement in line life and in operating characteristics for trimming heavier brush is obtained.

The foregoing description of the preferred embodiment of the invention is to be considered as illustrative and not as limiting. Various modifications will occur to those skilled in the art for performing substantially the same function, in substantially the same way, to achieve substantially the same result, without departing from the true scope of the invention as defined in the appended claims.

What is claimed is:

1. A fixed line trimmer head for string trimmer machines including in combination:
    a generally cylindrically-shaped hollow main housing member having a central axis and configured at a first end thereof for attachment to a drive shaft of a string trimmer machine and open at a second end thereof;
    first and second string entry holes through said main housing member in a first plane, said first and second string entry holes each spaced an equal distance from a first line passing through and perpendicular to the axis of said main housing member;
    first and second string exit openings through said main housing member on diametrically opposite sides thereof in a second plane perpendicular to the axis of said main housing member which is offset along the axis of said main housing member from said first plane.

2. The combination according to claim 1 wherein said first and second string exit openings are located on a line passing through the axis of said main housing member at an angle offset 90° from said first line.

3. The combination according to claim 2 further including guides located adjacent each of said exit openings and connected therewith to guide trimmer string exiting from said first and second string exit openings.

4. The combination according to claim 3 wherein said first and second string entry holes are formed along corresponding radii of said hollow main housing member.

5. The combination according to claim 4 further including a circular flange attached to said hollow main housing member between said first end and the location of said first and second string entry holes and said first and second string exit openings, and wherein said guides are flared guides attached to said circular flange.

6. The combination according to claim 5 wherein said flared guides are located in a housing having sloping surfaces thereon for deflecting objects which may be stricken by said trimmer head.

7. The combination according to claim 6 further including third and fourth string entry holes through said housing member in said first plane and each having a diameter greater than the diameter of said first and second string entry holes.

8. The combination according to claim 7 wherein said first and second string entry holes are located on a diametrically opposite side of said hollow main housing member from the location of said third and fourth string entry holes.

9. The combination according to claim 8 wherein said first and second string entry holes and said third and fourth string entry holes are located nearer the open second end of said main housing member than said first and second string exit openings.

10. The combination according to claim 9 wherein said third and fourth string entry holes are radially formed through said hollow main housing member.

11. The combination according to claim 10 wherein said fixed line trimmer head comprises a unitary metal assembly.

12. The combination according to claim 11 wherein said metal is aluminum.

13. The combination according to claim 12 wherein the outside diameter of said main housing member is approximately 2" and said distance between said first and second string entry holes is approximately 1".

14. The combination according to claim 13 wherein said first and second string exit openings have a diameter at least as great as the greatest diameter of said string entry holes.

15. The combination according to claim 9 wherein at least said string entry holes and said string exit openings are made of metal.

16. The combination according to claim 15 wherein said metal is aluminum.

17. The combination according to claim 1 further including a circular flange attached to said hollow main housing member between said first end and the location of said first and second string entry holes and said first and second string exit openings, and wherein said guides are flared guides attached to said circular flange.

18. The combination according to claim 17 wherein said flared guides are located in a housing having sloping surfaces thereon for deflecting objects which may be stricken by said trimmer head.

19. The combination according to claim 1 wherein said first and second string entry holes are formed angularly through said hollow main housing member along lines which are not perpendicular to the central axis of said main housing member.

20. The combination according to claim 19 further including third and fourth string entry holes through said housing member in said first plane and having a diameter greater than the diameter of said first and second string entry holes.

21. The combination according to claim 20 wherein said third and fourth string entry holes are formed angularly through said hollow main housing member along lines which are not perpendicular to the central axis of said main housing member.

22. The combination according to claim 21 wherein said first and second string exit openings have a diameter at least as great as the greatest diameter of said string entry holes.

23. The combination according to claim 22 wherein said first and second string entry holes are located on a diametrically opposite side of said hollow main housing member from the location of said third and fourth string entry holes.

24. The combination according to claim 23 wherein said first and second string entry holes and said third and fourth string entry holes are located nearer the open second end of said main housing member than said first and second string exit openings.

25. The combination according to claim 1 wherein said fixed line trimmer head comprises a unitary metal assembly.

26. The combination according to claim 25 wherein said metal is aluminum.

27. The combination according to claim 1 further including third and fourth string entry holes through said housing member in said first plane and having a diameter greater than the diameter of said first and second string entry holes.

28. The combination according to claim 27 wherein said first and second string entry holes are located on a diametrically opposite side of said hollow main housing member from the location of said third and fourth string entry holes.

29. The combination according to claim 28 wherein said first and second string entry holes and said third and fourth string entry holes are located nearer the open second end of said main housing member than said first and second string exit openings.

30. The combination according to claim 1 wherein at least said string entry holes and said string exit openings are made of metal.

31. The combination according to claim 30 wherein said metal is aluminum.

32. The combination according to claim 1 wherein the outside diameter of said main housing member is approximately 2" and said distance between said first and second string entry holes is approximately 1".

33. The combination according to claim 32 wherein said first and second string exit openings have a diameter at least as great as the greatest diameter of said string entry holes.

* * * * *